United States Patent [19]
Shibata et al.

[11] Patent Number: 5,798,499
[45] Date of Patent: Aug. 25, 1998

[54] ELECTRICALLY HEATING WINDSHIELD GLASS HAVING A SUBSTANTIALLY UNIFORM THERMAL DISTRIBUTION

[75] Inventors: Kiyoshi Shibata; Seiichi Miyasaka, both of Tokyo, Japan

[73] Assignee: Asahi Glass Company Ltd., Tokyo, Japan

[21] Appl. No.: 821,322

[22] Filed: Mar. 20, 1997

Related U.S. Application Data

[63] Continuation of Ser. No. 498,800, Jul. 6, 1995, abandoned.

[30] Foreign Application Priority Data

Jul. 8, 1994 [JP] Japan ................................. 6-179770

[51] Int. Cl.$^6$ ................................. B60L 1/02; E06B 7/00; H05B 3/06
[52] U.S. Cl. ......................... 219/203; 52/171.2; 219/522
[58] Field of Search ........................ 219/202, 203, 219/522, 528, 544, 548; 52/171.2; 428/49, 34, 46, 426, 435

[56] References Cited

U.S. PATENT DOCUMENTS

| | | |
|---|---|---|
| 3,261,739 | 7/1966 | Porter ................................. 219/522 |
| 3,475,588 | 10/1969 | McMaster ........................... 219/203 |
| 3,553,833 | 1/1971 | Jochim et al. ...................... 219/203 |
| 3,721,594 | 3/1973 | Tarnopol et al. .................... 219/203 |
| 3,789,192 | 1/1974 | Spindler ............................. 219/522 |
| 3,903,396 | 9/1975 | Boaz et al. ......................... 219/522 |
| 3,947,618 | 3/1976 | Gruss ................................. 219/203 |
| 3,995,142 | 11/1976 | Ciardelli et al. .................... 219/522 |
| 4,057,671 | 11/1977 | Shoop ................................ 219/203 |
| 4,073,986 | 2/1978 | Keslar et al. ....................... 219/203 |
| 4,453,594 | 6/1984 | Karla et al. ......................... 219/203 |
| 4,703,328 | 10/1987 | Jones et al. ........................ 219/522 |
| 4,883,940 | 11/1989 | Tokarz ............................... 219/203 |
| 5,132,162 | 7/1992 | De Paoli ............................ 428/192 |
| 5,354,966 | 10/1994 | Sperbeck ........................... 219/203 |
| 5,525,401 | 6/1996 | Hirmer ............................... 428/210 |

*Primary Examiner*—Teresa J. Walberg
*Assistant Examiner*—Sam Paik
*Attorney, Agent, or Firm*—Oblon, Spivak, McClelland, Maier & Neustadt, P.C.

[57] ABSTRACT

An electrically heating windshield glass has two glass plates; a polyvinylbutyral sheet interposed between the two glass plates; a pair of bus bars provided at peripheral portions of the glass plates and between them; and a number of tungsten wires connected between a pair of the bus bars. The diameter of the tungsten wires or the space between adjacent tungsten wires is continuously and/or stepwisely changed in response to a change of the distance between the bus bars.

24 Claims, 5 Drawing Sheets

ELECTRICALLY HEATING WINDSHIELD GLASS HAVING A SUBSTANTIALLY UNIFORM THERMAL DISTRIBUTION

This application is a Continuation of application Ser. No. 08/498,800, filed on Jul. 6, 1995, now abandoned.

BACKGROUND OF THE INVENTION

1. Field of the Invention

The present invention relates to an electrically heating windshield glass used for, for instance, a windshield glass for a vehicle. More particularly, it relates to an electrically heating windshield glass capable of uniformly and quickly melting snow, ice or frost and having a non-fogging effect.

2. Discussion of Background

In winter seasons or cold areas, snow, ice or frost deposits on the front glass, the rear glass and so on of trains, electric cars, trucks, passenger cars and so on, or such glass becomes moist. It is difficult to quickly remove snow, ice, frost or moist. As a method of solving the problem, there has been proposed to use an electrically heating windshield glass for a window.

The electrically heating windshield glass made by a conventional technique generally comprises two glass plates, a resinous interlayer interposed between the two glass plates, a pair of bus bars provided at peripheral portions of the glass plates and between them, and a number of electrically heating wires connected between a pair of the bus bars. As the electrically heating wires, very fine tungsten wires or molybdenum wires which can not be seen with the naked eye and assure the transparency of the windshield glass, are used. Heat is generated in the windshield glass by passing a current from a battery or the like through the bus bars to the electrically heating wires, whereby the melting of snow or ice, dehumidification or the like is effected by the generation of heat.

In a case that the conventional electrically heating windshield glass is used for, for instance, the front glass of a vehicle, several hundreds of electrically heating wires having the same diameter are connected between the upper and lower bus bars with the same intervals and in the vertical direction in a state that the wires are embedded in the interlayer, wherein the upper and lower bus bars are arranged in a substantially parallel relation to thereby form a rectangular area. The rectangular area defines a heating area for melting snow or ice, or dehumidification.

In the conventional technique, when the above-mentioned electrically heating windshield glass is used as a front glass for a vehicle wherein the front glass has a trapezoidal shape having the upper side which is shorter than the lower side, it is difficult to use both side portions each having a substantially triangular area as heating areas although the rectangular area at the central portion can be used as a heating region, whereby a sufficient effect of melting snow or ice or dehumidification may not be obtained. The surface area of each of the triangular areas at both sides is large as the difference of length between the lower side and the upper side is large. Accordingly, the effect of melting snow or ice, or non-fogging in these areas is further decreased whereby a sufficient eyesight for driving can not be obtained.

In order to solve the above-mentioned problems, there can be considered that the electrically heating wires are embedded in the triangular areas. In this case, however, the density of electric power in the areas is higher than that of the rectangular area. As a result, a distribution of temperature in the surface of the windshield glass is large whereby there causes problems of a lower energy efficiency, a difference in effect of melting ice or non-fogging on the surface of glass and a considerable heat deterioration of the interlayer in the triangular areas in which the electrically heating wires are embedded.

SUMMARY OF THE INVENTION

Accordingly, it is an object of the present invention to eliminate the problems by the conventional techniques and to provide an electrically heating windshield glass having a small thermal distribution in the surface of the windshield glass, which has a trapezoidal shape or a shape including a triangular area, thereby providing a good efficiency of energy consumption, having excellent effect of melting ice or snow, or non-fogging, and providing a wide eyesight for driving.

The above-mentioned object and other objects of the present invention have been attained by providing an electrically heating windshield glass which comprises two glass plates; a resinous interlayer interposed between the two glass plates; at least a pair of bus bars provided at peripheral portions of the glass plates and between them; and a number of electrically heating wires connected between a pair of the bus bars, wherein the diameter of the electrically heating wires and/or the space between adjacent electrically heating wires is continuously or stepwisely changed in response to a change of the distance between the bus bars.

The problems in the conventional techniques can be solved by continuously or stepwisely changing the density of electric power to the electrically heating wires in response to a change of the distance between the bus bars in the electrically heating windshield glass. Accordingly, even when the electrically heating windshield glass has a trapezoidal shape or a shape including a triangular area, a distribution of temperature in the surface of the glass can be small. Accordingly, high energy efficiency, excellent effect of melting ice or non-fogging and a wide eyesight for driving can be obtained.

In this specification, a center line is referred to as a line extending vertically from the central portion of the upper side of the windshield glass to the lower side.

The distance between the bus bars in the present invention means the distance from the lower edge of the upper bus bar to the upper edge of the lower bus bar in parallel to the above-mentioned center line at each position of the embedded electrically heating wires.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
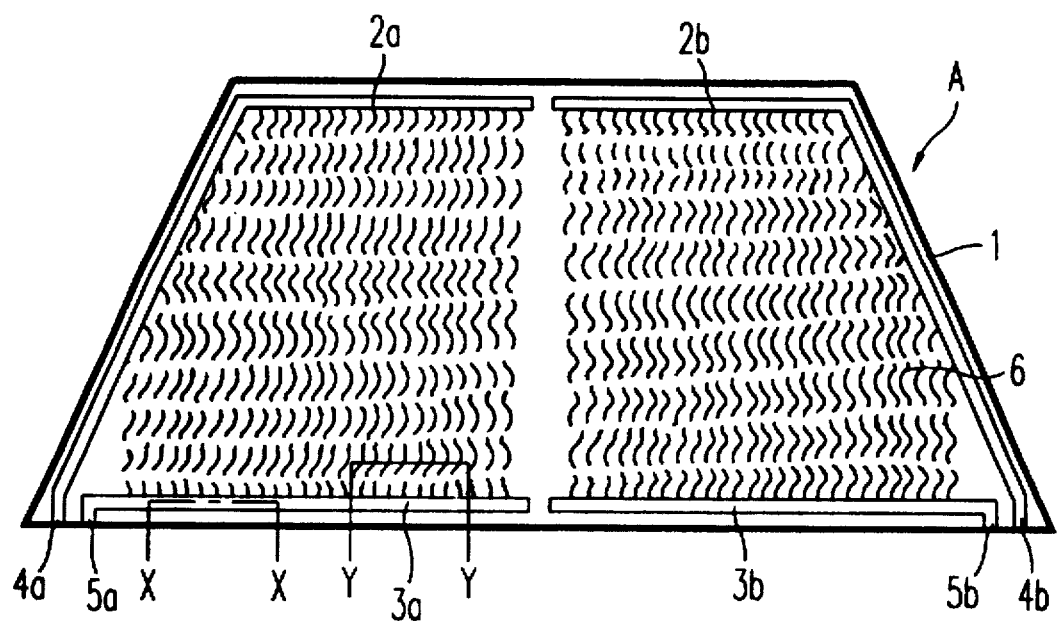
FIG. 1 is a diagram explaining a plane of an electrically heating windshield glass A.

Preferred embodiments of the present invention will be described in more detail.

The windshield glass used in the present invention may be an ordinary glass plate, a float glass plate, a strengthened glass plate, a partially strengthened glass plate or the like. It may also be colored to the extent that the transparency is not reduced. These glass plates are not limited to a flat plate-like form, but they may have various kinds of shape or have a curved surface bent with a predetermined radius of curvature. However, a remarkable effect can be obtained in the present invention by using a glass plate such as a front glass, a rear glass, a side glass or a roof glass which has a triangular region for various kinds of vehicle. Further, although the thickness of these glass plates is not in particular limited, a thickness of about 1.5–5 mm is generally used.

The resinous interlayer used in the present invention should be one capable of strongly bonding two glass plates when a laminated glass is formed, and preventing fragments of glass from scattering even when the laminated glass is broken. For this purpose, a polyvinylbutyral sheet having improved physical properties such as adhesion properties, light resistance, heat resistance and so on is preferably used. The thickness of the resinous interlayer is not in particular limited. However, a thickness of about 0.2–0.9 mm is generally used.

In forming a laminated glass comprising two glass plates and a resinous interlayer interposed therebetween, a known method may be used wherein two glass plates with a resin sheet interposed therebetween are subjected to steps of preliminarily bonding, a treatment in an autoclave and so on to thereby form a predetermined laminated glass.

The electrically heating wires can be arranged by the following method, for instance. A number of very fine electrically heating wires are embedded in a resin sheet with predetermined spaces. The resin sheet may be previously cut in a predetermined shape or may be cut after the electrically heating wires have been embedded. Both end portions of the electrically heating wires are raised from the resin sheet; a tape-like plain woven cloth of copper or a tape-like thin copper plate is placed between the resin sheet and the heating wires; the raised end portions of the electrically heating wires are put on the woven cloth of copper or the thin copper plate; another tape-like thin copper plate is placed on the end portions of the electrically heating wires, and a pressure is applied onto them to unify the same. In the case of using the plain woven cloth of copper, it is partially embedded in the resin sheet. Then, the before-mentioned steps such as the preliminarily bonding and the treatment in an autoclave are used to thereby obtain a predetermined electrically heating windshield glass.

The present invention is featurized by providing uniformly the density of electric power supplied across a pair of the bus bars over the entirety of an electrically heating windshield glass by continuously or stepwisely changing the diameter of a number of electrically heating wires and/or the space between adjacent electrically heating wires in response to a change of the distance between a pair of the bus bars connected to the electrically heating wires.

The present invention will be described in more detail with reference to the drawings.

FIG. 1 is a plan view showing an embodiment of the electrically heating windshield glass according to the present invention wherein an upper glass plate in a laminated glass is omitted. A glass plate 1 constituting a laminated glass in this embodiment has a trapezoidal shape in which the lower side is longer than the upper side (for instance, it has an upper side of 104 cm, a lower side of 148 cm and a height of 83 cm).

An electrically heating windshield glass A has bus bars 2a and 2b at left and right upper sides and bus bars 3a and 3b at left and right lower sides. Lead wires 4a, 4b, 5a and 5b are connected to an end portion of the bus bars so that an electric current is supplied to the bus bars from a battery (not shown). The width of the bus bars 2a, 2b, 2b and 3a, 3b in this embodiment is generally about 3–10 mm.

In a rectangular area defined by the upper bus bars 2a, 2b and the lower bus bars 3a, 3b, electrically heating wires 6 of a diameter of 10–35 µm are arranged in a sinusoidal waveform in a parallel relation with intervals of about 1.5–4.0 mm. As the electrically heating wires 6, tungsten wires, molybdenum wires or the like having a diameter of about 10–35 µm are preferably used.

Further, the shape of the electrically heating wires 6 should be in a sinusoidal waveform having an amplitude of about 0.2–1.5 mm and a wavelength of about 2–8 mm, whereby heat can be uniformly generated in the electrically heating windshield glass A in terms of either temperature or optics.

Figure 4:
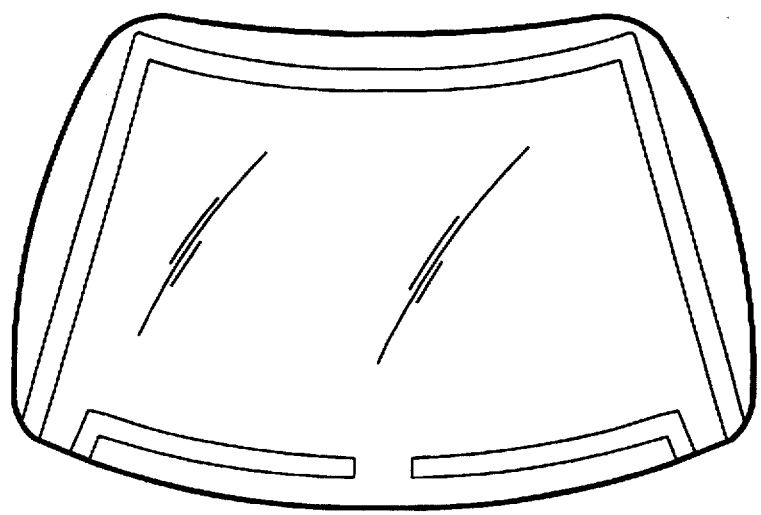
FIG. 4 is a diagram showing an outer configuration which is similar to an actual windshield glass for a vehicle.

In FIG. 1, the windshield glass is shown as a form of model. However, in an actual windshield glass for a vehicle, the upper and lower sides are not linear but curved as shown in FIG. 4. Accordingly, it is rare that the distance between the upper and lower sides is equal over the entire length of the upper and lower sides. However, it is unnecessary to continuously or stepwisely adjust the diameter of the electrically heating wires and/or the space between adjacent electrically heating wires as positive measures as far as there is not a remarkable variation in the distance of the bus bars (for instance, unless there is a variation of more than ±15%). On the other hand, since there is a remarkable difference between the bus bars at a left or right upper side and the bus bars at the left or right lower side, depending on positions in the triangular area the above-mentioned adjustment is required.

Figure 2A:
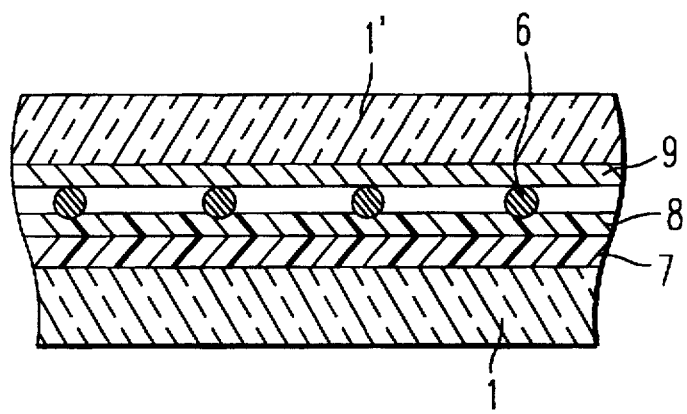
FIGS. 2a and 2b are respectively cross-sectional views taken along lines X—X and Y—Y in FIG. 1.

FIG. 2a is a cross-sectional view taken along a line X—X of the electrically heating windshield glass at a location where a bus bar is arranged. As shown in FIG. 2a, a resinous interlayer 7 is laminated on the lower glass plate 1, and on the interlayer 7, a tape-like electrode 8 formed of a plain woven cloth of copper which constitutes the lower portion of the bus bar, the electrically heating wires 6, a tape-like electrode 9 formed of a thin copper plate which constitutes the upper portion of the bus bar, and an upper glass plate 1' are successively laminated.

The thickness of the upper and lower electrodes 9, 8 which constitute the bus bar 3a should be thin as possible so that the difference of thickness of the electrically heating windshield glass A as the final product between a portion which includes the bus bar 3a and a portion which does not include the bus bar is minimum. For instance, it is preferable that the total thickness of the upper and lower electrodes should be about 0.1–0.4 mm. Further, by the same reason, at least a part of the lower electrode 8 should be embedded in the resinous interlayer 7 in the final product.

The lower electrode 8 should be formed by weaving very fine wires into a form of woven cloth, whereby the thickness of the final product which may be increased in the presence of the bus bars 2, 3 can be reduced. Since the form of woven cloth is used, the electrically heating wires 6 are embedded into the woven cloth 8 in the final product, whereby an increase in the entire thickness of the final product can be minimized.

Figure 2B:
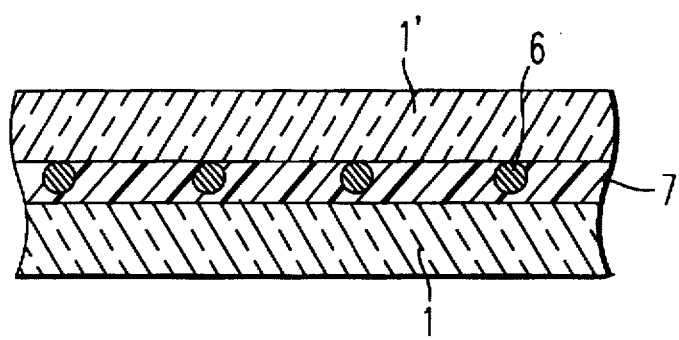

FIG. 2b is a cross-sectional view taken along a line Y—Y of the windshield glass at a position where no bus bars 2, 3 exist. As shown in FIG. 2b, the resinous interlayer 7 in which the electrically heating wires 6 are embedded and the upper glass plate 1' are laminated in this order on the lower glass plate 1.

Figure 3:
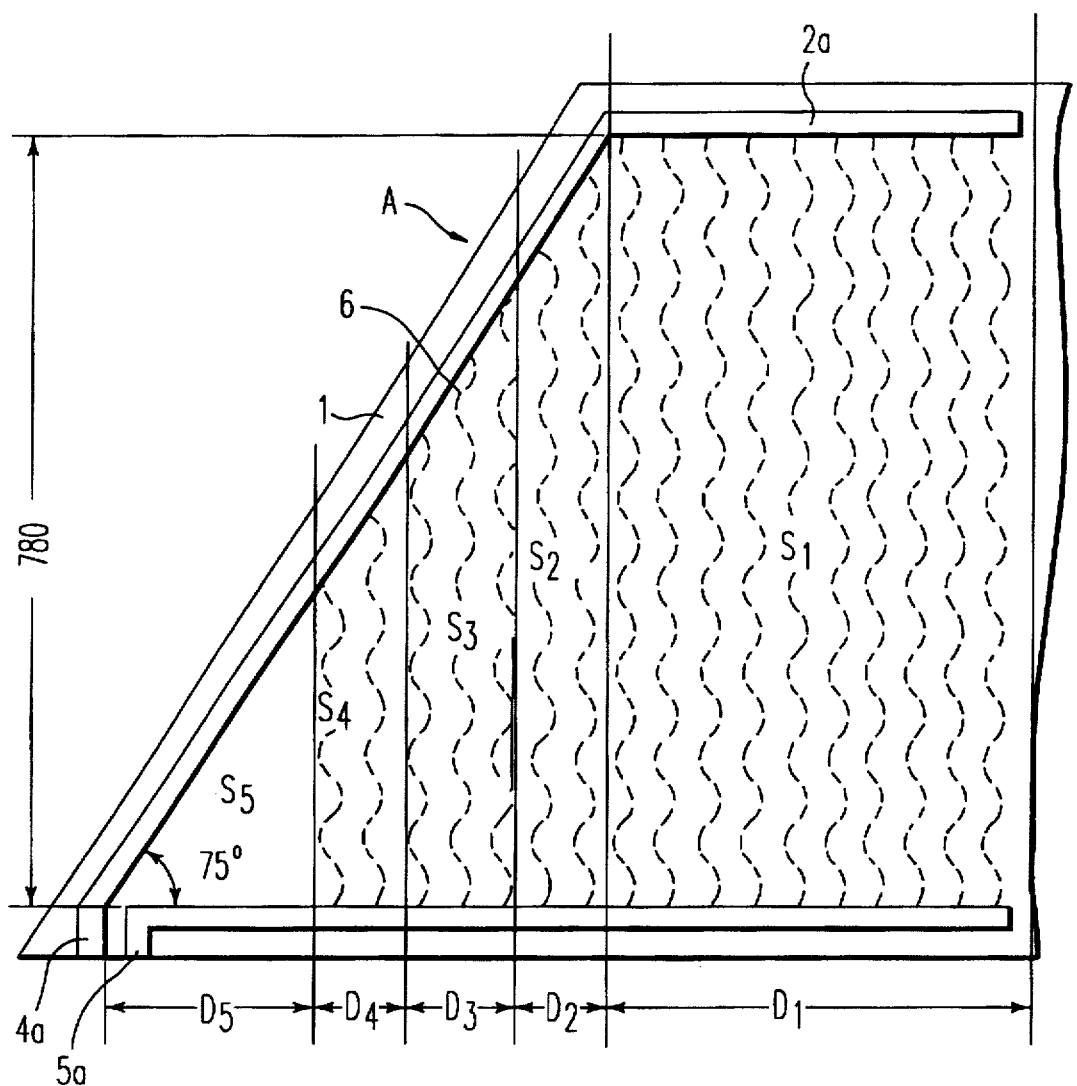
FIG. 3 is an enlarged view of a left half portion of the electrically heating windshield glass A.

FIG. 3 is an enlarged view showing a triangular area of the electrically heating windshield glass A of a trapezoidal shape shown in FIG. 1. In a region $S_1$ of the electrically heating windshield glass A, fine tungsten wires 6 having a diameter of 21 μm are vertically arranged with intervals of 2 mm in a parallel relation. In a region $S_2$ as a part of a triangular area, the length of the electrically heating wires 6 is not substantially different from the length in the region $S_1$. Accordingly, when the variation of the density of electric power in the region $S_2$ is within an allowable range, electrically heating wire 6 having the same diameter as those in the region $S_1$ may be used. On the other hand, the diameter of the fine wires in the region $S_2$ may be smaller than that in the region $S_1$, and the fine wires may be arranged in the vertical direction in a parallel relation with the same intervals as in the region $S_1$. In the present invention, an allowable range practically used is ±20%, preferably ±15%.

In a region $S_3$, similarly, fine wires 6 having a smaller diameter than that in the region $S_1$ or $S_2$ are arranged vertically in a parallel relation with the same intervals as the region $S_1$. In a region $S_4$, fine wires 6 having a smaller diameter than the region $S_3$ are arranged vertically in parallel with the same intervals as the region $S_1$. For a region $S_5$, it is generally unnecessary to arrange the electrically heating wires 6 when the region is outside of the driver eyesight in driving.

Figure 5:
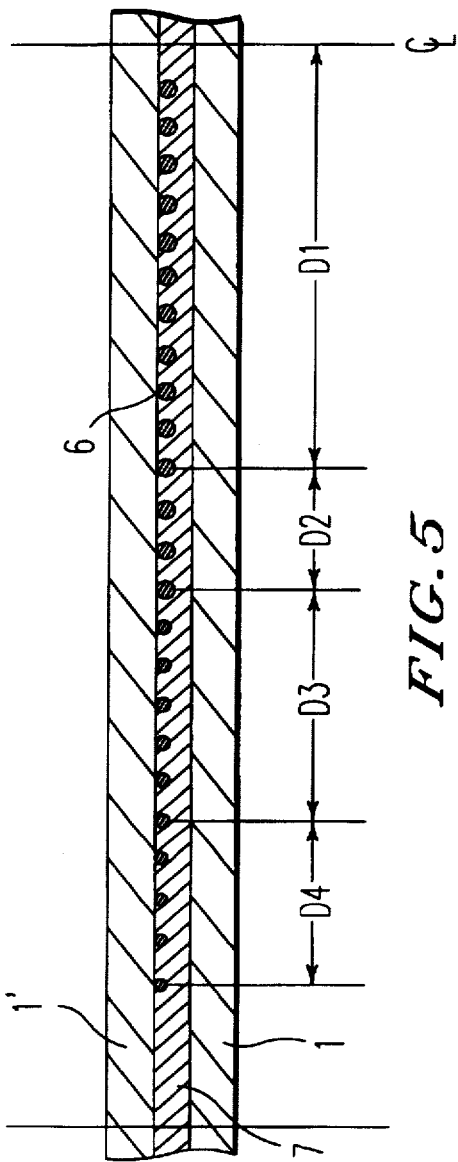
FIG. 5 is a cross-sectional view of an embodiment of the present invention.

FIG. 5 illustrates an example of a stepwise change of the diameter of the heating wires. Given this illustration, one can also visualize a continuous change of the diameter of the heating wires.

In the electrically heating windshield glass A having the above-mentioned construction, when a current is supplied from the battery (not shown) as a power source via the bus bars 2a, 2b and 3a, 3b a uniform density of electric power is obtainable in the region $S_1$ having a substantially rectangular area because the diameter, and in this area, the length of the electrically heating wires 6 are equal. In the region $S_2$ as a part of the triangular area, if the electrically heating wires 6 having the same diameter as those in the region $S_1$ are used, the density of electric power is more or less larger than the region $S_1$. In this case, however, a value of the density of electric power is within the allowable range, and accordingly, the electrically heating wires 6 having the same diameter can be used. When the value is out of the allowable range, the electrically heating wires 6 having a smaller diameter should be used in the region $S_2$ so that the density of electric power in the region $S_2$ can be substantially the same as the region $S_1$. Similarly, for the regions $S_3$ and $S_4$, the diameter of the electrically heating wires 6 in these regions are adjusted so that the density of electric power has a value within the same allowable range as the region $S_1$.

In the above-mentioned embodiment, the triangular area is divided into several regions, and the diameter of the electrically heating wires 6 is changed depending on the divided regions while the spaces of the electrically heating wires 6 are kept to be the same. As a result, the density of electric power in these regions can be adjusted to be the same as that in the region $S_1$.

Besides the above-mentioned technique, the same effect of generating a uniform heat can be obtained without dividing the triangular area into several regions. Namely, the diameter of the electrically heating wires 6 in the triangular area is continuously changed for each number or every predetermined number in proportion to the length of the heating wires (or the space of the bus bars), such as 20 μm→19 μm→18 μm→17 μm→16 μm→15 μm→ 14 μm . . . .

In the above-mentioned embodiments, the density of electric power in different regions is controlled to be within a substantially approximate range by reducing the diameter of the electrically heating wires as the distance between the bus bars become short while the space between the electrically heating wires is made constant. However, it is possible to control the density of electric power in regions having different distances between the bus bars within a substantially approximate range by changing the space of the electrically heating wires while the diameter of the wires is unchanged.

The present invention will be described with reference to Examples. However, it should be understood that the present invention is by no means restricted by such specific Examples.

EXAMPLE 1

FIG. 1 is plan view of the electrically heating windshield glass A of the present invention which is used for a front glass for a vehicle; FIG. 2 is a cross-sectional view showing a part of FIG. 1; and FIG. 3 is an enlarged view showing a left half portion of the electrically heating windshield glass A of the present invention. A wiring circuit in the electrically heating windshield glass A is as shown in FIG. 3.

In FIGS. 1 and 3, upper bus bars 2a and 2b and lower bus bars 3a and 3b are embedded in an interlayer 7 of a polyvinylbutyral sheet having a thickness of 0.76 mm so as to be along the outer periphery of the glass plate. The bus bars 2a, 2b and 3a, 3b comprise a tape-like lower electrode 8 formed by weaving copper wires, which has a width of 3.5 mm and a thickness of about 0.3 mm and an upper electrode 9 formed of a tape-like copper plate, which has a width of 5 mm and a thickness of about 0.05 mm. Electrically heating wires 6 having different diameters as shown in Table 1 are interposed in a contacting state between the lower and upper electrodes 8, 9 in regions $S_1$ to $S_4$.

In a case that there is a restriction in current density for a fuse to be disposed in a heating circuit, it is preferable to divide the bus bars 2a, 2b and 3a, 3b into each two parts of bus bars 2a, 2b, 3a and 3b to form symmetric circuits of heating at left and right sides so that a current to be passed in lead wires and the bus bars can be small. Electrically heating wires 6 formed of fine tungsten wires are connected between the bus bars 2a, 2b and 3a, 3b to form a heating region.

The bus bars 2a, 2b and 3a, 3b each comprising two conductors interpose end portions of the electrically heating wires 6 to connect them electrically, and each end of the bus bars 2a, 2b and 3a, 3b is connected to a battery (not shown) as a power source via lead wires 4a, 4b, 5a and 5b. A side surface of the resinous interlayer 7 in which the electrically heating wires 6 are embedded is bonded to the glass plate 1' facing the exterior of the vehicle, and the other side of the layer 7 is bonded to the glass plate 1 of the interior side. A laminated glass was prepared by a known manufacturing method using an autoclave. A design for electrically heating is determined in consideration of a power source voltage, a density of electric power and regions to be heated. Generally, it is necessary to use a density of electric power of 500–800 W/m² in order to dissolve an ice layer deposited on the front glass of an passenger car. However, a requisite density of electric power varies depending on the thickness of the glass plate, the thickness of the interlayer, and conditions of use of a defroster, an air conditioner and so on. The space of the electrically heating wires 6 should be narrower because the thermal distribution on the surface of the glass plate is uniform. Further, it is desirable that the diameter of the electrically heating wires 6 should be fine as possible in order to assure good eyesight for driving.

FIG. 3 shows a heating region at a left side of the electrically heating windshield glass A. The region $S_1$ as a heating region in which the distance between the bus bars is substantially constant, is not sufficient to provide a defrost region ruled by the U.S. Federal Motor Vehicle Safety Standard (FMVSS103). Accordingly, it is necessary to use the triangular region in which the distance between the bus bars is gradually reduced, and to embed the electrically heating wires 6 in the resinous interlayer 7 in each of the regions $S_2$–$S_4$ in the triangular area. The electrically heating wires may be embedded in the region $S_5$. However, it is unnecessary when the region $S_5$ is out of the driver's eyesight. With respect to the regions $S_2$–$S_4$ in the triangular area in which the distance between the bus bars varies, the diameter of the electrically heating wires 6 should be changed for each of the regions so that the density of electric power for each of the regions $S_2$–$S_4$ is within an allowable range.

The resistance values per unit length of the electrically heating wires 6 in the region $S_1$ in which the bus bars are substantially parallel (the rectangular area) and either of non-parallel regions (regions constituting a part of the triangular area) $S_2$–$S_4$ are supposed to be $r_1$ and $r_2$; the lengths between the bus bars in the regions are to be $l_1$ and $l_2$ and electric currents flowing element wires are to be $i_1$ and $i_2$. Since the element wires 6 are connected in parallel, there is a relation: $l_1 r_1 i_1 = l_2 r_2 i_2$. Further, from the condition that the density of electric power in the heating region be constant, there is a relation: $r_1 i_1^2 = r_2 i_2^2$. Accordingly, $r_2 = r_1 (l_1/l_2)^2$. Further, since the resistance of the element wires 6 is in inverse proportion to the square of the diameter of the wire d, there is a relation $d_2 = d_1 (l_2/l_1)$. Accordingly, when the diameter of the electrically heating wires 6 is made in proportion to the distance between the bus bars, the density of electric power in the surface of the laminated glass in the heating region can be within the allowable range.

Since the diameter of commercially available tungsten wires 6 can be selected at each step of 1 μm, and the density of electric power in the heating regions $S_1$–$S_4$ should be controlled within the allowable range, the heating regions were divided into four regions $S_1$–$S_4$, and tungsten wires 6 having different diameters were fixed by bonding in the regions (provided that the diameter of the wires in the regions $S_1$ and $S_2$ was the same).

The thicknesses of the glass plates of the interior side and the exterior side of the vehicle were 2 mm. A power source voltage of 14.3 V was used. The amplitude and the wavelength of the each of the electrically heating wires 6 arranged in a sinusoidal form were 0.6 mm and 4 mm, and the space between adjacent wires were 2 mm. Design for the density of electric power in each of the regions was so made that a target value was 630 W/m² and an allowable range was ±15%. The diameter of the wires, the width of the regions, the number of wires fixed by bonding and the density of electric power in each of the regions were determined as shown in Table 1.

An electric power was supplied from a power source to the electrically heating windshield glass of the present invention and temperatures at portions in the surface of the exterior side glass plate were measured. As a result, the variation of temperature in the heating regions was within 6° C. In the conventional electrically heating windshield glass in which the electrically heating wires having the same diameter were used, the variation of temperature was 16° C. Accordingly, in the present invention, the temperature of the glass surface of the windshield glass is uniformly increased, and a wide eyesight can be maintained.

TABLE 1

| Region | Diameter of wire (μm) | Resistance (Ω/m) | Width of region (mm) | Number of wires fixed by bonding | Density of electric power (W/m²) |
|---|---|---|---|---|---|
| $S_1$ | 21 | 265 | $D_1$ = 498 | 249 | 634 |
| $S_2$ | 21 | 265 | $D_2$ = 14 | 7 | 640–721 |
| $S_3$ | 18 | 361 | $D_3$ = 26 | 13 | 540–704 |
| $S_4$ | 16 | 457 | $D_4$ = 18 | 9 | 569–695 |
| $S_5$ | — | — | $D_5$ = 150 | 0 | 0 |

EXAMPLE 2

In FIGS. 1 and 3, the density of electric power in the heating regions in which the space between the bus bars is changed, can be controlled within an approximate range by changing the space of the electrically heating wires fixed by bonding while the diameter of the electrically heating wires is the same.

In this example, the heating regions are divided into four regions $S_1$–$S_4$, and the space between the electrically heating wires fixed by bonding in the triangular region in which the space between the bus bars is gradually reduced, is gradually broadened (FIG. 6), whereby the density of electric power in the heating regions can be controlled within the allowable range.

Figure 6:
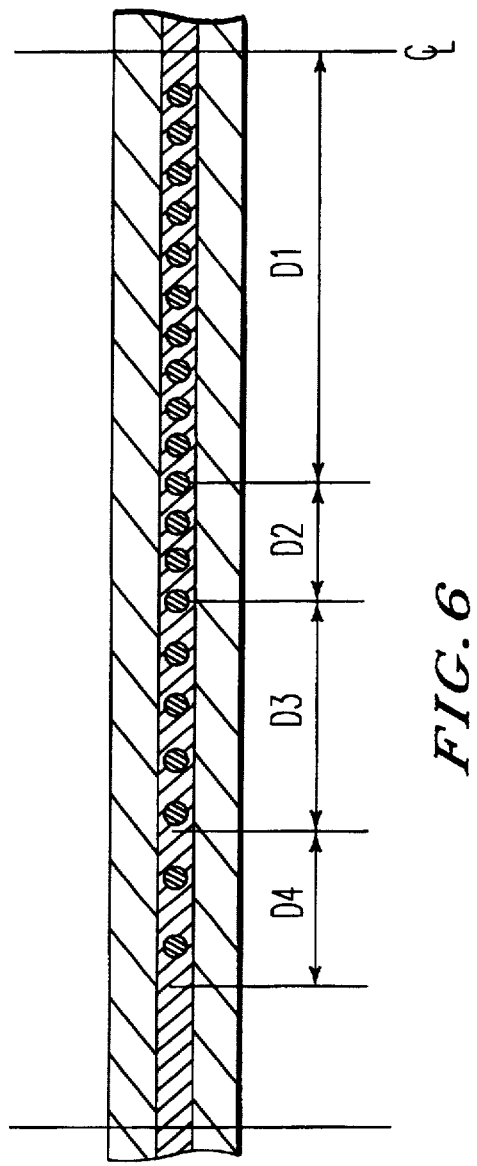
FIG. 6 is a cross-sectional view of a further embodiment of the present invention.

In this example, each space of the electrically heating wires fixed by bonding in each of the regions $S_1$–$S_4$ is the same, however, the space between the electrically heating wires fixed by bonding in adjacent regions is stepwisely changed (FIG. 6). From this figure, one can also visualize a continuous change of the spacing between the heating wires. In the rectangular region $S_1$ in which the bus bars at the central portion in the heating region are substantially parallel, the space of the electrically heating wires embedded in the interlayer is 2 mm. The amplitude and the wavelength of the electrically heating wires of a sinusoidal waveform which consist of tungsten wires of a diameter of 21 μm are 0.6 mm and 4 mm respectively. When a target value for the density of electric power in each of the regions is to be 630 W/m² and an allowable range is to be ±15%, the space between the electrically heating wires in each of the regions, the widths of the regions, the number of electrically heating wires and the density of electric power are shown in Table 2.

TABLE 2

| Region | Space between wires fixed by bonding (mm) | Width of region (mm) | Number of wires fixed by adhesion | Density of electric power (W/m$^2$) |
| --- | --- | --- | --- | --- |
| S$_1$ | 2.0 | D$_1$ = 497 | 249 | 634 |
| S$_2$ | 2.0 | D$_2$ = 14 | 7 | 640–721 |
| S$_3$ | 2.7 | D$_3$ = 27 | 10 | 545–710 |
| S$_4$ | 3.6 | D$_4$ = 18 | 5 | 545–666 |
| S$_5$ | — | D$_5$ = 149 | 0 | 0 |

As described above, the electrically heating windshield glass of the present invention has a heating region in which temperature is uniformly increased by passing a current in electrically heating wires even when ice deposits on the surface of glass facing an exterior side of a vehicle in winter season, whereby ice is rapidly melted to thereby maintain a wide eyesight suited for the safety standard.

Further, melting of ice, non-fogging, removing moist and so on can be quickly performed to restore the eyesight of a driver quickly. Further, less electric power is required in comparison with a defroster for blowing warm air, and operation is done with a low voltage in comparison with a thin film resistance heating type electrically heating windshield glass. In addition, a converter, a line breakage detector and so on are unnecessary which reduces manufacturing cost.

Obviously, numerous modifications and variations of the present invention are possible in light of the above teachings. It is therefore to be understood that within the scope of the appended claims, the invention may be practiced otherwise than as specifically described herein.

What is claimed is:

1. An electrically heating windshield glass which comprises:

first and second glass plates;

a resinous interlayer interposed between the first and second glass plates;

at least a pair of bus bars provided at peripheral portions of the glass plates and between the glass plates; and a number of electrically heating wires connected between a pair of the bus bars, wherein the windshield glass has at least a substantially triangular area and diameters of the electrical heating wires which are located in a vicinity of a center line of said glass plates are greater than diameters of the electrical heating wires which are located in a vicinity of the peripheral portions of the glass plate, such that the diameter of each of the electrically heating wires continuously decreases in response to a decrease of a distance between the bus bars.

2. An electrically heating windshield glass according to claim 1, wherein the windshield glass is for a vehicle.

3. An electrically heating windshield glass according to claim 1, wherein the bus bars comprises plural pairs of bus bars.

4. An electrically heating windshield glass which comprises:

first and second glass plates;

a resinous interlayer interposed between the first and second glass plates;

at least a pair of bus bars provided at peripheral portions of the glass plates and between the glass plates; and a number of electrically heating wires connected between a pair of the bus bars, wherein the windshield glass has at least a substantially triangular area and diameters of the electrical heating wires which are located in a vicinity of a center line of said glass plates are greater than diameters of the electrical heating wires which are located in a vicinity of the peripheral portions of the glass plates, such that the diameter of each of the electrically heating wires stepwisely decreases in response to a decrease of a distance between the bus bars.

5. An electrically heating windshield glass according to claim 4, wherein the windshield glass is for a vehicle.

6. An electrically heating windshield glass according to claim 4, wherein the bus bars comprises plural pairs of bus bars.

7. An electrically heating windshield glass which comprises:

first and second glass plates;

a resinous interlayer interposed between the first and second glass plates;

at least a pair of bus bars provided at peripheral portions of the glass plates and between the glass plates; and a number of electrically heating wires connected between a pair of the bus bars, wherein the windshield glass has at least a substantially triangular area in which a space between adjacent electrically heating wires in a vicinity of a center line of the glass plates is smaller than a space between adjacent electrically heating wires located in a vicinity of the peripheral portions of the glass plates, such that the space between adjacent electrically heating wires continuously increases in response to a decrease of a distance between the bus bars.

8. An electrically heating windshield glass according to claim 7, wherein the windshield glass is for a vehicle.

9. An electrically heating windshield glass according to claim 7, wherein the bus bars comprises plural pairs of bus bars.

10. An electrically heating windshield glass which comprises:

first and second glass plates;

a resinous interlayer interposed between the first and second glass plates;

at least a pair of bus bars provided at peripheral portions of the glass plates and between the glass plates; and a number of electrically heating wires connected between a pair of the bus bars, wherein the windshield glass has at least a substantially triangular area in which a space between adjacent electrically heating wires in a vicinity of a center line of the glass plates is smaller than a space between adjacent electrically heating wires in a vicinity of the peripheral portions of the glass plates, such that the space between adjacent electrical heating wires stepwisely increases in response to a decrease of a distance between the bus bars.

11. An electrically heating windshield glass according to claim 10, wherein the windshield glass is for a vehicle.

12. An electrically heating windshield glass according to claim 10, wherein the bus bars comprises plural pairs of bus bars.

13. An electrically heating windshield glass which comprises:

first and second glass plates;

a resinous interlayer interposed between the first and second glass plates;

at least a pair of bus bars provided at peripheral portions of the glass plates and between the glass plates; and a number of electrically heating wires connected between a pair of the bus bars, wherein the windshield glass has at least a substantially triangular area in which a diameter along an entire length of each of the electrically heating wires and a space between adjacent electrically heating wires along an entire length of the adjacent electrically heating wires are continuously changed in response to a change of a distance between the bus bars.

14. An electrically heating windshield glass according to claim 13, wherein the windshield glass is for a vehicle.

15. An electrically heating windshield glass according to claim 13, wherein the bus bars comprises plural pairs of bus bars.

16. An electrically heating windshield glass which comprises:

first and second glass plates;

a resinous interlayer interposed between the first and second glass plates;

at least a pair of bus bars provided at peripheral portions of the glass plates and between the glass plates; and a number of electrically heating wires connected between a pair of the bus bars, wherein the windshield glass has at least a substantially triangular area in which a diameter along an entire length of each of the electrically heating wires and a space between adjacent electrically heating wires along an entire length of the adjacent electrically heating wires are stepwisely changed in response to a change of a distance between the bus bars.

17. An electrically heating windshield glass according to claim 16, wherein the windshield glass is for a vehicle.

18. An electrically heating windshield glass according to claim 16, wherein the bus bars comprises plural pairs of bus bars.

19. An electrically heating windshield glass which comprises:

first and second glass plates;

a resinous interlayer interposed between the first and second glass plates;

at least a pair of bus bars provided at peripheral portions of the glass plates and between the glass plates; and a number of electrically heating wires connected between a pair of the bus bars, wherein the windshield glass has at least a substantially triangular area in which a diameter along an entire length of each of the electrically heating wires is stepwisely changed, and a space between adjacent electrically heating wires along an entire length of the adjacent electrical heating wires is continuously changed, in response to a change of a distance between the bus bars.

20. An electrically heating windshield glass according to claim 19, wherein the windshield glass is for a vehicle.

21. An electrically heating windshield glass according to claim 19, wherein the bus bars comprises plural pairs of bus bars.

22. An electrically heating windshield glass which comprises:

first and second glass plates;

a resinous interlayer interposed between the first and second glass plates;

at least a pair of bus bars provided at peripheral portions of the glass plates and between the glass plates; and a number of electrically heating wires connected between a pair of the bus bars, wherein the windshield glass has at least a substantially triangular area in which a diameter along an entire length of each of the electrically heating wires is continuously changed, and a space between adjacent electrically heating wires along an entire length of the adjacent electrically heating wires is stepwisely changed, in response to a change of a distance between the bus bars.

23. An electrically heating windshield glass according to claim 22, wherein the windshield glass is for a vehicle.

24. An electrically heating windshield glass according to claim 22, wherein the bus bars comprises plural pairs of bus bars.

* * * * *